United States Patent
Hsieh et al.

(10) Patent No.: US 7,071,702 B2
(45) Date of Patent: Jul. 4, 2006

(54) MULTI-JACK DETECTOR

(75) Inventors: Ming-Jane Hsieh, Tai Pei (TW); Chuting Su, Hsinchu (TW); Yi-Shu Chang, Tai Nan (TW); Ming-Lih Lin, Tai Pei (TW)

(73) Assignee: Realtek Semiconductor Corp., Hsin-Chu (TW)

( * ) Notice: Subject to any disclaimer, the term of this patent is extended or adjusted under 35 U.S.C. 154(b) by 16 days.

(21) Appl. No.: 10/776,536

(22) Filed: Feb. 12, 2004

(65) Prior Publication Data

US 2004/0190384 A1    Sep. 30, 2004

(30) Foreign Application Priority Data

Mar. 26, 2003    (TW) ............................... 92107030 A

(51) Int. Cl.
*G01R 31/04* (2006.01)
*G01R 19/00* (2006.01)
*H01H 31/02* (2006.01)
*H04M 1/00* (2006.01)

(52) U.S. Cl. .................. 324/538; 324/555; 324/66; 379/442

(58) Field of Classification Search ............ 324/66–67, 324/538, 555, 537, 756; 379/20–21, 27.01, 379/442; 381/58–60, 74; 369/1; 455/564
See application file for complete search history.

(56) References Cited

U.S. PATENT DOCUMENTS

| | | | | |
|---|---|---|---|---|
| 4,600,810 A | * | 7/1986 | Feldman et al. | 379/21 |
| 5,050,214 A | * | 9/1991 | Lee | 381/311 |
| 5,847,557 A | * | 12/1998 | Fincher et al. | 324/66 |
| 6,397,087 B1 | * | 5/2002 | Kim et al. | 455/569.1 |
| 6,763,087 B1 | * | 7/2004 | Chen et al. | 379/1.04 |
| 2003/0139204 A1 | * | 7/2003 | Lim | 455/564 |
| 2004/0108845 A1 | * | 6/2004 | Shieh et al. | 324/66 |

FOREIGN PATENT DOCUMENTS

JP    2002-101491 A    4/2002
TW         578345     12/2002

\* cited by examiner

*Primary Examiner*—Anjan Deb
*Assistant Examiner*—Jeff Natalini
(74) *Attorney, Agent, or Firm*—Birch,Stewart,Kolasch & Birch,LLP

(57) ABSTRACT

A multi-jack detector for detecting states of a plurality of jacks. Each jack comprises a first switch having a first normally closed terminal and a first output terminal. The multi-jack detector comprises a plurality of bias resistors each coupled to one of the first output terminals, respectively; a control unit for determining the states of the plurality of jacks; wherein the first normally closed terminals are commonly coupled to a first node and the control unit determines the states of the plurality of jacks according to a voltage at the first node. Because the voltage at the first node is different for each state of the jacks, the detector can detects the states of the jacks using a single I/O pin.

13 Claims, 4 Drawing Sheets

| state | S1(PJ1) | S2(PJ2) | S3(PJ3) | RL | Vin |
|---|---|---|---|---|---|
| 0 | 0 | 0 | 0 | 8/7 R | 2.67V |
| 1 | 0 | 0 | 1 | 8/6 R | 2.86V |
| 2 | 0 | 1 | 0 | 8/5 R | 3.08V |
| 3 | 0 | 1 | 1 | 8/4 R | 3.33V |
| 4 | 1 | 0 | 0 | 8/3 R | 3.64V |
| 5 | 1 | 0 | 1 | 8/2 R | 4V |
| 6 | 1 | 1 | 0 | 8/1 R | 4.44V |
| 7 | 1 | 1 | 1 | * | 5V |

US 7,071,702 B2

MULTI-JACK DETECTOR

This Non-provisional application claims priority under 35 U.S.C. §119(a) on patent application Ser. No. 092107030 filed in Taiwan on Mar. 26, 2003, the entire contents of which are hereby incorporated by reference.

BACKGROUND OF THE INVENTION

1. Field of the Invention

The invention relates to a multi-jack detector, and more particularly to a multi-jack detector for detecting states of jacks using a single I/O pin.

2. Description of the Related Art

Along with advances in technologies, a variety of types of jacks, such as Line, Surround, Center, and LFE-Out output jacks are often disposed in a single apparatus. As a result, an electronic device such as an audio card (i.e., a sound card) usually needs a jack detector to detect the state of each jack in order to detect whether external terminals are inserted into the output jacks.

FIG. 1 is a schematic illustration showing the connection between a control unit and multiple phone-jacks. As shown in FIG. 1, the control unit 11 mainly outputs audio signals to each of the phone-jacks PJ1, PJ2 and PJ3, and detects the connection state of each jack. The jack PJ1 outputs main audio signals (Line-out R & L), the jack PJ2 outputs LFE-out audio signals (LFE-out) and the center output audio signals (CEN-out), and the jack PJ3 outputs surround audio signals (Surround-out R & L). Each of the phone-jacks PJ1, PJ2 and PJ3 of the system has at least one switch (e.g., pins 2 and 3 of each jack) to indicate the insertion states of the external terminals. Because in FIG. 1 the system has three phone-jacks PJ1, PJ2 and PJ3, the control unit 11 needs three I/O pins DT1, DT2 and DT3 to receive insertion state signals of the phone-jacks PJ1, PJ2 and PJ3. If the system has five phone-jacks, the control unit 11 needs five I/O pins to receive the insertion state signals of the five jacks. In the integrated circuit (IC) manufacturing processes, the more the number of I/O pins is, the more the manufacturing process costs. Therefore, if the number of I/O pins is reduced, the manufacturing cost of the control unit may be decreased.

SUMMARY OF THE INVENTION

It is therefore one of the many objects of the invention to provide a multi-jack detector for detecting states of jacks using a single I/O pin according to impedance distribution.

To achieve the above-mentioned object, a multi-jack detector for detecting states of a plurality of jacks is disclosed. Each jack comprises a first switch having a first normally closed terminal and a first output terminal. The multi-jack detector comprises a plurality of bias resistors each coupled to one of the first output terminals, respectively; a control unit for determining the states of the plurality of jacks; wherein the first normally closed terminals are commonly coupled to a first node and the control unit determines the states of the plurality of jacks according to a voltage at the first node.

Because the voltage at the first node is different for each state of the jacks, the detector can detects the states of the jacks using a single I/O pin.

DETAILED DESCRIPTION OF THE INVENTION

The multi-jack detector of the invention will be described hereinafter with reference to the accompanying drawings.

Figure 1:
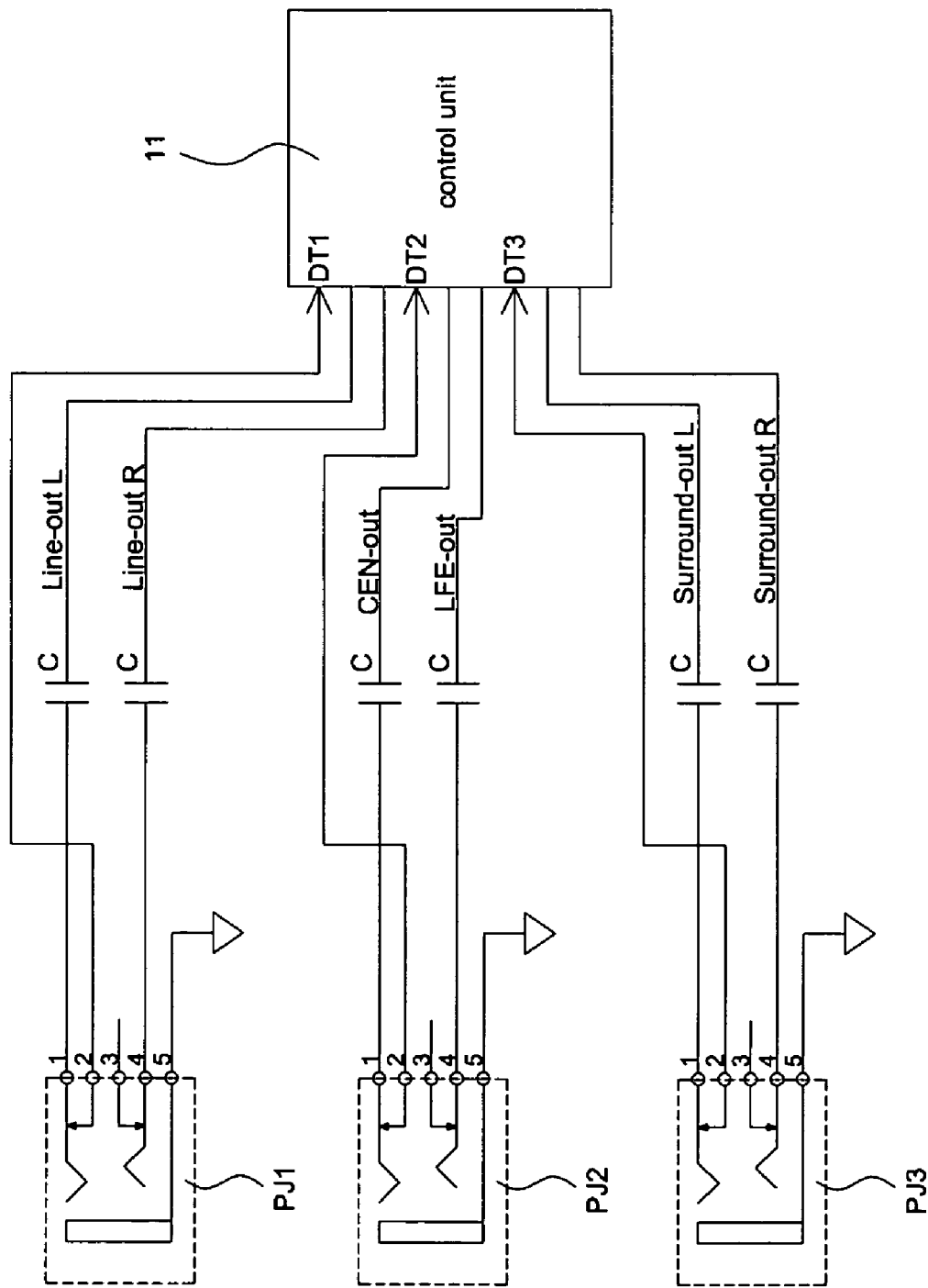
FIG. 1 is a schematic illustration showing the connection between a control unit and multiple phone-jacks.
Figure 2:
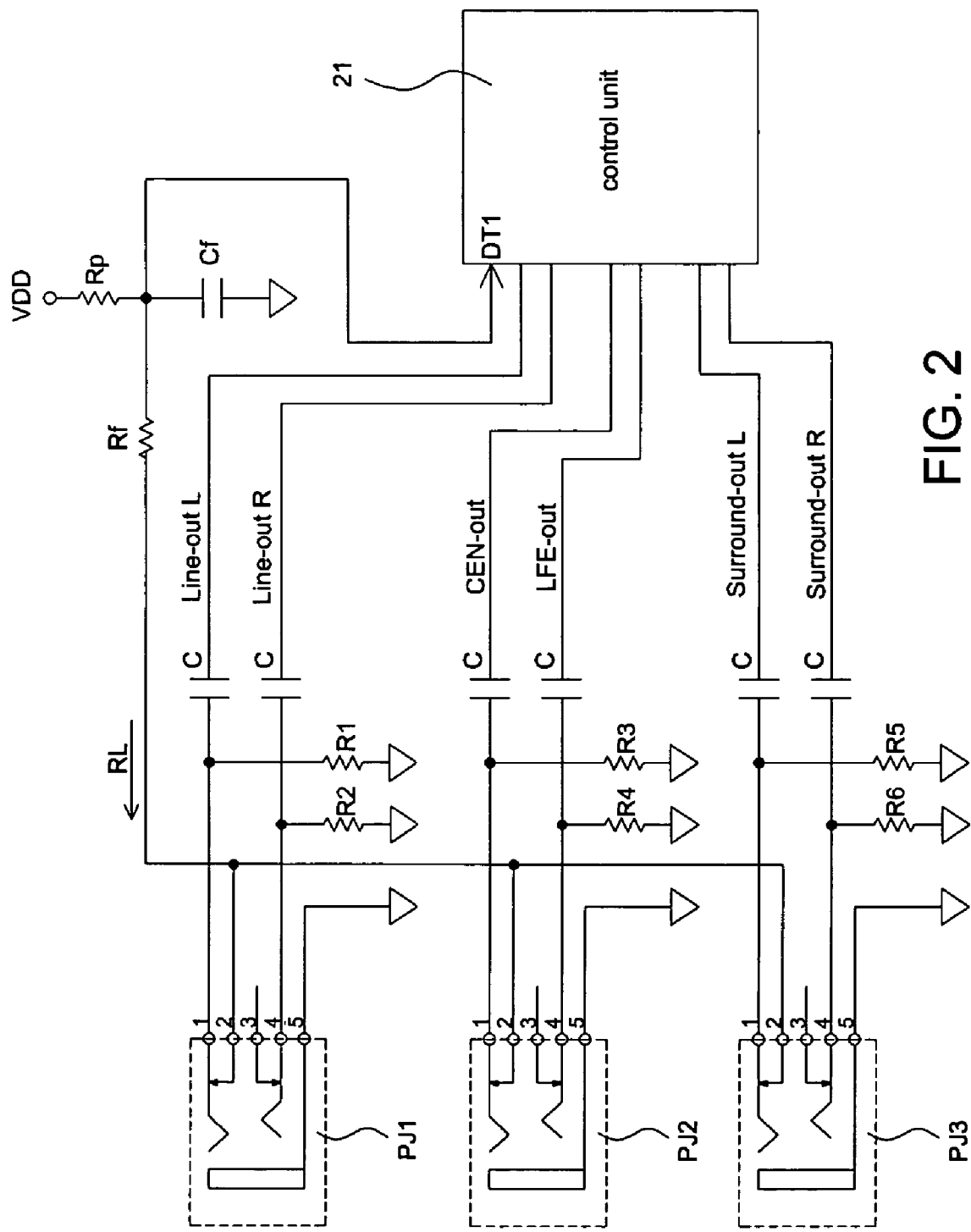
FIG. 2 shows a multi-jack detector applied to multiple phone-jacks according to a first embodiment of the invention.

FIG. 2 shows a multi-jack detector applied to multiple phone-jacks according to a first embodiment of the invention. Referring to FIG. 2, an audio signal output system includes three phone-jacks PJ1, PJ2 and PJ3, and a control unit 21. The phone-jacks PJ1, PJ2 and PJ3 have pins 1 and 4 serving as output terminals for audio signals, pins 5 serving as grounded terminals, and pins 2 and 3 serving as NC (normally closed) terminals. When an external terminal is not inserted into the phone-jack, the NC terminal is electrically connected to the output terminal. When the external terminal is inserted into the phone-jack, the NC terminal is not electrically connected to the output terminal. The pins 1 and 4 of the phone-jack PJ1 are grounded via a bias resistor R1 and a matching resistor R2, respectively. The pins 1 and 4 of the phone-jack PJ2 are grounded via a bias resistor R3 and a matching resistor R4, respectively. The pins 1 and 4 of the phone-jack PJ3 are grounded via a bias resistor R5 and a matching resistor R6, respectively. The matching resistors R2, R4 and R6 are resistors for matching the two output terminals of each jack, and have resistances equal to those of the bias resistors R1, R3 and R5, respectively. Of course, if resistance matching is not an issue, the matching resistors may also be omitted. The pins 2 of the phone-jacks PJ1, PJ2 and PJ3 are connected together, and connected to a state detection I/O pin (I/O Pin) DT1 of the control unit 21 via a filter resistor Rf, which may also be omitted. If the resistance of each bias resistor is properly selected to make the voltages at the I/O pin DT1 in various states different from each other or one another, the system may detect the terminal insertion state of each of the phone-jacks PJ1, PJ2 and PJ3 using a single I/O pin, thereby reducing the number of I/O pins.

Figures 3, 4:
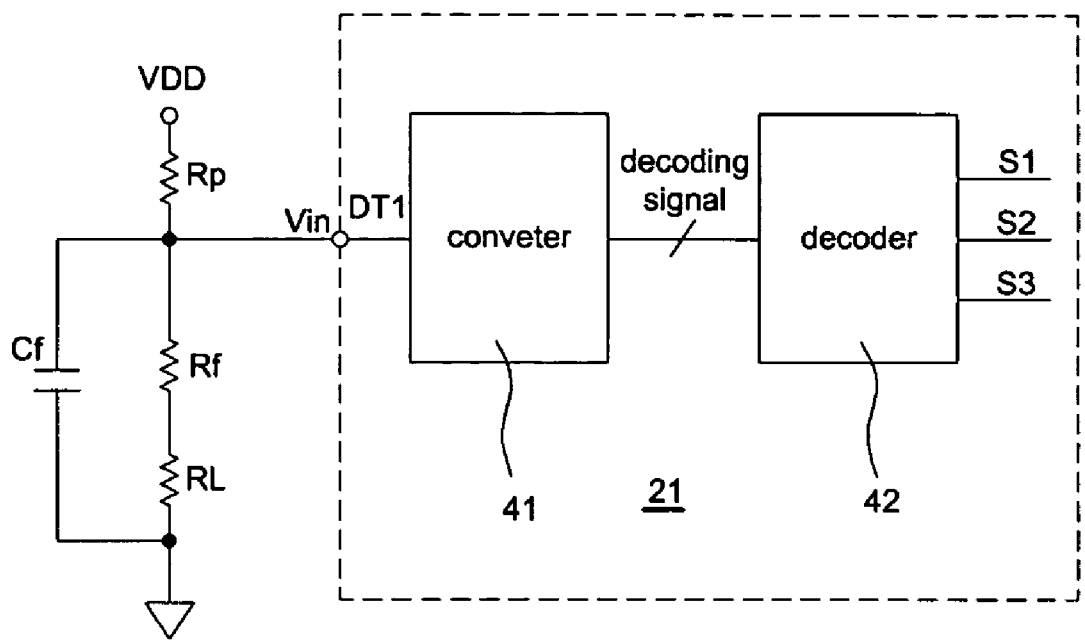
FIG. 3 is a partial block diagram showing an equivalent circuit and the control unit.
FIG. 4 shows the resistance of the load resistor RL and the magnitude of the input voltage Vin corresponding to the states of the phone-jacks PJ1, PJ2 and PJ3.

FIG. 3 is a partial block diagram showing an equivalent circuit of the multiple phone-jacks and the control unit 21 in FIG. 2. As shown in FIG. 3, the equivalent circuit obtained by viewing outwardly from the detection pin DT1 of the control unit 21 includes a pull-up resistor Rp, a filter resistor Rf and a load resistor RL, which are connected in series, and a filter capacitor Cf, which is connected in parallel with the filter resistor Rf and the load resistor RL, wherein the load resistor RL is defined as the resistance by viewing outwardly from the filter resistor Rf. If the resistance of the filter resistor Rf is far smaller than that of the load resistor RL, the filter resistor Rf may be neglected. Thus, the input voltage Vin may be regarded as a bias voltage between the pull-up resistor Rp and the load resistor RL. Because the resistances of the load resistor RL are different in various connection states of the jacks, the detected input voltages Vin at the pin DT1 are also different. Consequently, the control unit 21 according to this embodiment of the invention utilizes the converter 41 to convert the input voltage Vin at the detection pin DT1 into a decoding signal, and then utilizes the decoder 42 to generate detection signals S1, S2 and S3 according to the decoding signal. The converter 41 may be an analog-to-digital converter.

If the resistances of the bias resistors R1, R3 and R5 are 2R, 4R and 8R, respectively, the resistance of the pull-up resistor Rp is R, and the voltage source Vdd is 5V, then the listing of the states of the phone-jacks PJ1, PJ2, and PJ3 corresponding to the resistance of the load resistor RL and the magnitude of the input voltage Vin are shown in FIG. 4. Because there are three phone-jacks PJ1, PJ2 and PJ3, there are eight connection states of the jacks in total. The states are described in the following.

In state 0, there is no external terminal being inserted into the phone-jacks PJ1, PJ2 and PJ3. Therefore, the equivalent resistance formed by the phone-jacks PJ1, PJ2 and PJ3 equals to that of the bias resistors R1, R3 and R5 connected in parallel. That is, the load resistor RL is 8/7R and the input voltage Vin is 2.67V.

In state 1, there is an external terminal being inserted into the phone-jack PJ3. Therefore, the equivalent resistance formed by the phone-jacks PJ1, PJ2 and PJ3 equals to that of the bias resistors R1 and R3 connected in parallel. That is, the load resistor RL is 8/6R and the input voltage Vin is 2.86V.

In state 2, there is an external terminal being inserted into the phone-jack PJ2. Therefore, the equivalent resistance formed by the phone-jacks PJ1, PJ2 and PJ3 equals to that of the bias resistors R1 and R5 connected in parallel. That is, the load resistor RL is 8/5R and the input voltage Vin is 3.08V.

In state 3, there are two external terminals being inserted into the phone-jack PJ2 and PJ3, respectively. Therefore, the equivalent resistance formed by the phone-jacks PJ1, PJ2 and PJ3 equals to that of the bias resistor R1. That is, the load resistor RL is 8/4R and the input voltage Vin is 3.33V.

In state 4, there is an external terminal being inserted into the phone-jack PJ1. Therefore, the equivalent resistance formed by the phone-jacks PJ1, PJ2 and PJ3 equals to that of the bias resistors R3 and R5 connected in parallel. That is, the load resistor RL is 8/3R and the input voltage Vin is 3.64V.

In state 5, there are two-external terminals being inserted into the phone-jack PJ1 and PJ3, respectively. Therefore, the equivalent resistance formed by the phone-jacks PJ1, PJ2 and PJ3 equals to that of the bias resistor R3. That is, the load resistor RL is 8/2R and the input voltage Vin is 4V.

In state 6, there are two external terminals being inserted into the phone-jack PJ1 and PJ2, respectively. Therefore, the equivalent resistance formed by the phone-jacks PJ1, PJ2 and PJ3 equals to that of the bias resistor R5. That is, the load resistor RL is 8/1R and the input voltage Vin is 4.4V.

In state 7, there are three external terminals being inserted into the phone-jack PJ1, PJ2 and PJ3, respectively. Therefore, the equivalent resistance formed by the phone-jacks PJ1, PJ2 and PJ3 is infinite. That is, the load resistor RL is cut off and the input voltage Vin is 5V.

In this embodiment, when the detection signal S1 is H, it means that an external terminal is inserted into the phone-jack PJ1. The same interpretation can be applied to the output states of the detection signals S2 and S3 and will be readily appreciated by one skilled in the art without further descriptions.

Consequently, it can be understood from FIG. 4 that the resistances of the load resistor RL and the input voltages Vin are different no matter which of the phone-jacks PJ1, PJ2 and PJ3 has been inserted with an external terminal. So, the control unit 21 is capable of detecting which of the phone-jacks PJ1, PJ2 and PJ3 has been inserted with an external terminal accordingly.

Figure 5:
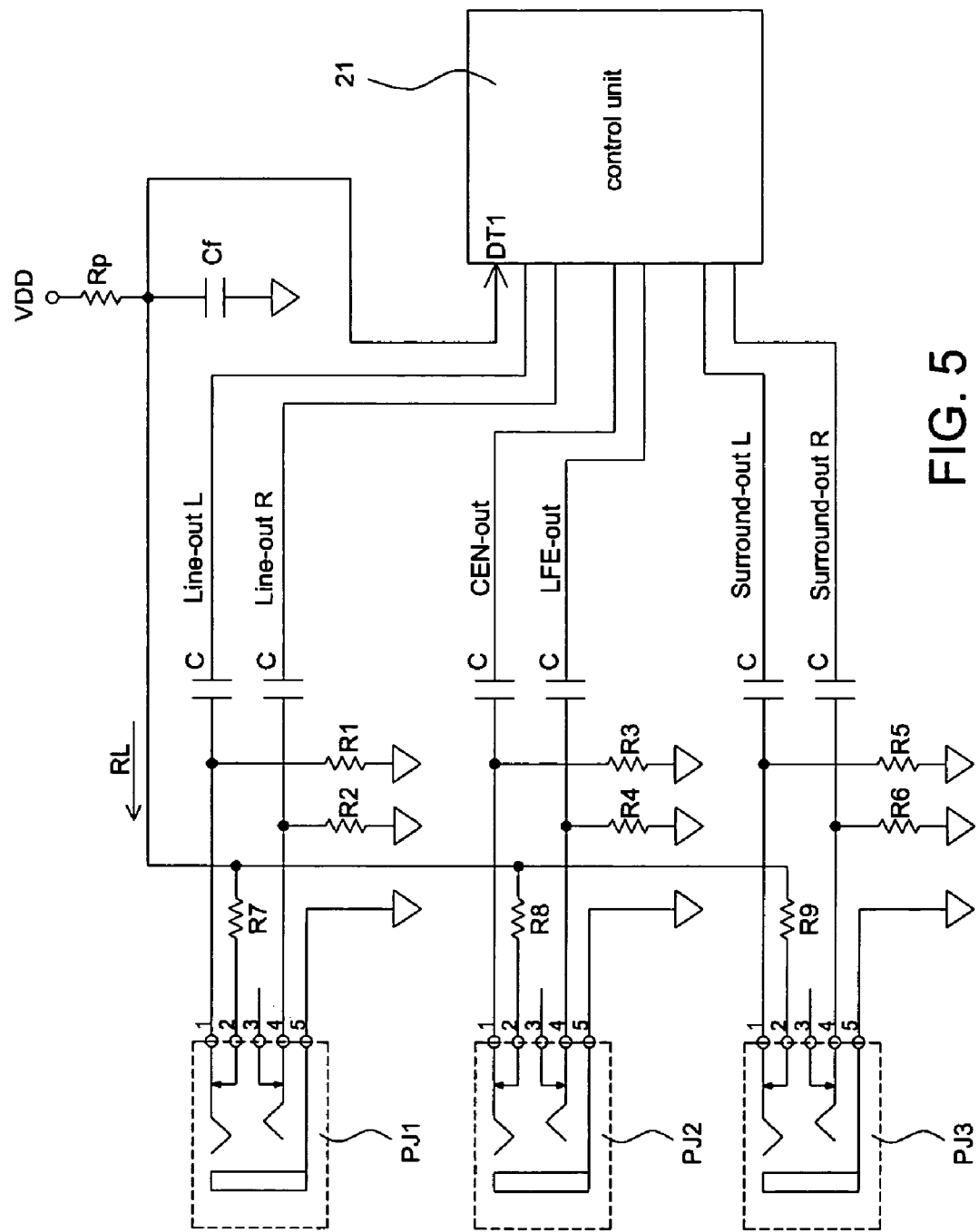
FIG. 5 shows a multi-jacks detector applied to multiple phone-jacks according to a second embodiment of the invention.

FIG. 5 shows a multi-jack detector applied to multiple phone-jacks according to a second embodiment of the invention. In the first embodiment of FIG. 2, the pins 2 of the phone-jacks PJ1, PJ2 and PJ3 are connected together. However, in the second embodiment of FIG. 5, the pins 2 of the phone-jacks PJ1, PJ2 and PJ3 are coupled together through adjusting resistors R7, R8 and R9, respectively. By utilizing resistors positioned at different locations, such as R1, R3, R5 at pin 1's, R2, R4, R6 at pin 4's, and R7, R8, R9 at pin 2's, the resistances needed may be adjusted with more flexibility. In the second embodiment, for example, the resistances of the bias resistors R1, R3 and R5 and the pull-up resistor Rp are set to be R, and the resistances of the adjusting resistors R7, R8 and R9 are set to be R, 3R and 7R, respectively. Thus, it is possible to generate different load resistances and input voltages under different states.

While certain exemplary embodiments have been described and shown in the accompanying drawings, it is to be understood that such embodiments are merely illustrative of and not restrictive on the broad invention, and that this invention not be limited to the specific construction and arrangement shown and described, since various other modifications may occur to those ordinarily skilled in the art.

What is claimed is:

1. A detector for detecting states of a plurality of jacks, each jack comprising a first switch having a first normally closed terminal and a first output terminal, and a second switch having a second normally closed terminal and a second output terminal, the detector comprising:
   a plurality of bias resistors each coupled to one of the first output terminals, respectively;
   a control unit for determining the states of the plurality of jacks; and
   a plurality of matching resistors each coupled to one of the second output terminals, respectively, so as to match with an output resistance of the first and the second switches of the plurality of jacks;
   wherein the first normally closed terminals are commonly coupled to a first node and the control unit determines the states of the plurality of jacks according to a voltage at the first node.

2. The detector according to claim 1 further comprising:
   a pull-up resistor having a first terminal coupled to a power source, and a second terminal coupled to the first node.

3. The detector according to claim 1 wherein the control unit comprises:
   a converter for outputting a decoding signal according to the voltage at the first node; and
   a decoder for receiving the decoding signal and decoding the decoding signal into a corresponding state signal, which indicates the state of each of the jacks;
   wherein resistances of the bias resistors are configured such that a value of the decoding signal corresponds to the states of the jacks.

4. The detector according to claim 3, wherein the converter is an analog-to-digital converter.

5. The detector according to claim 1, further comprising a plurality of adjusting resistors through each of which one of the first normally closed terminals are coupled to the first node, respectively.

6. The detector according to claim 1, further comprising:
a filter capacitor coupled to the first node; and
a filter resistor coupled between the commonly coupled first normally closed terminals and the first node.

7. The detector according to claim 1, wherein the bias resistors have different resistances.

8. The detector according to claim 7, wherein the bias resistors have resistances sequenced in a geometric progression having a common ratio of 2.

9. A detector for detecting states of a plurality of jacks, each jack comprising a first switch having a first normally closed terminal and a first output terminal and a second switch having a second normally closed terminal and a second output terminal, when there is no external terminal being inserted into a jack, the first normally closed terminal of the jack is coupled to the first output terminal of the jack and the second normally closed terminal of the jack is coupled to the second output terminal of the jack, and when there is an external terminal being inserted into the jack, the first normally closed terminal of the jack is not coupled to the first output terminal of the jack and the second normally closed terminal of the jack is not coupled to the second output terminal of the jack, the detector comprising:
a plurality of bias resistors each coupled to one of the first output terminals, respectively;
a control unit for determining the states of the plurality of jacks; and
a plurality of matching resistors each coupled to one of the second output terminals, respectively, so as to match with an output resistance of the first and the second switches of the plurality of jacks;
wherein the first normally closed terminals are commonly coupled to a first node and the control unit determines the states of the plurality of jacks according to a voltage at the first node.

10. The detector according to claim 10 further comprising:
a pull-up resistor having a first terminal coupled to a power source, and a second terminal coupled to the first node.

11. The detector according to claim 9 wherein the control unit comprises:
a converter for outputting a decoding signal according to the voltage at the first node; and
a decoder for receiving the decoding signal and decoding the decoding signal into a corresponding state signal, which indicates the state of each of the jacks;
wherein resistances of the bias resistors are configured such that a value of the decoding signal corresponds to the states of the jacks.

12. The detector according to claim 9, further comprising a plurality of adjusting resistors through each of which one of the first normally closed terminals are coupled to the first node, respectively.

13. The detector according to claim 9, further comprising:
a filter capacitor coupled to the first node; and
a filter resistor coupled between the commonly coupled first normally closed terminals and the first node.

* * * * *